Patented Jan. 6, 1925.

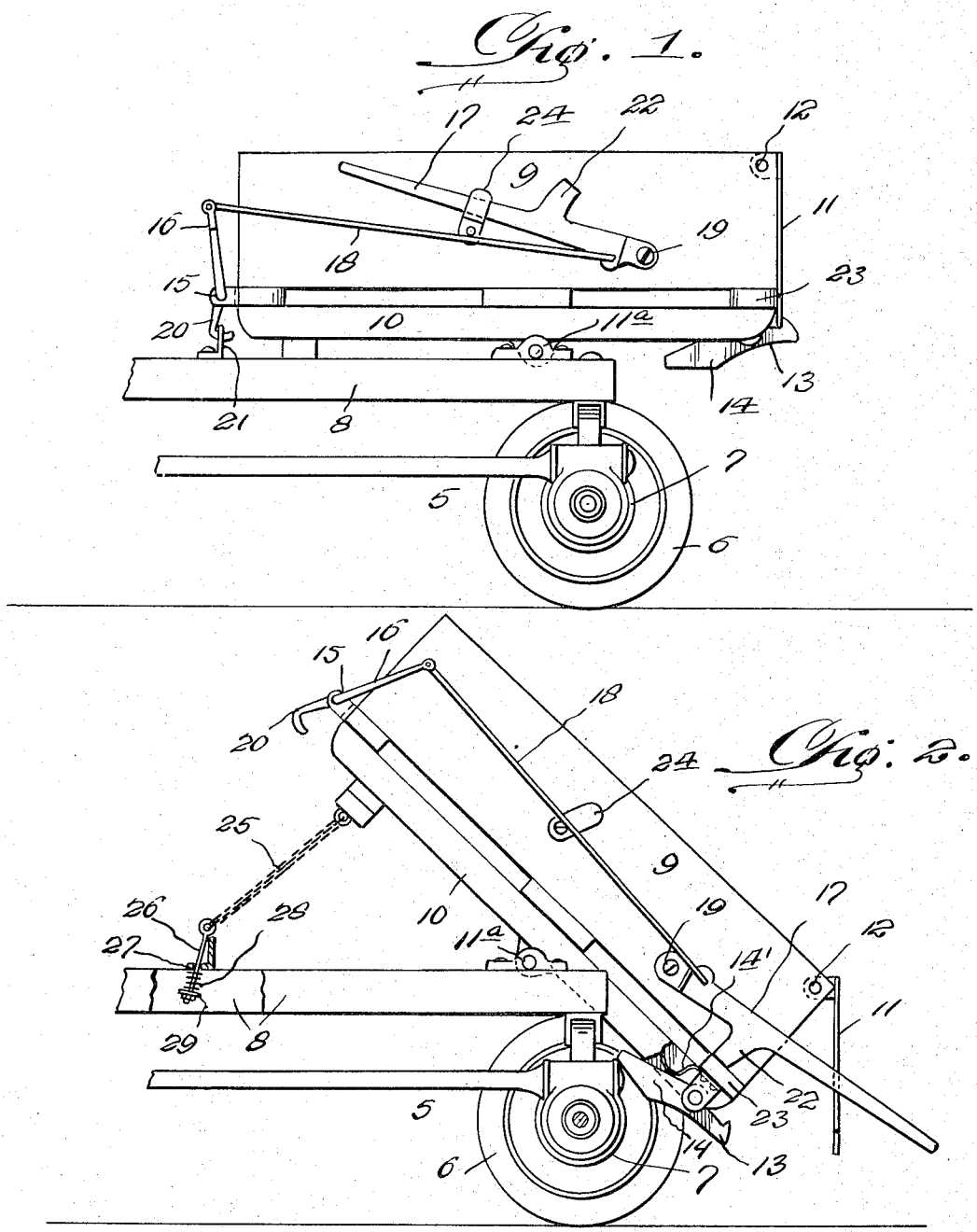

1,522,162

UNITED STATES PATENT OFFICE.

NEWTON WELTON, OF MONROE CITY, INDIANA.

DUMP BODY FOR MOTOR-VEHICLE CHASSIS.

Application filed January 26, 1924. Serial No. 688,730.

*To all whom it may concern:*

Be it known that I, NEWTON WELTON, citizen of the United States, residing at Monroe City, in the county of Knox and State of Indiana, have invented certain new and useful Improvements in Dump Bodies for Motor-Vehicle Chassis, of which the following is a specification.

This invention relates to dump body vehicles and has particular reference to a dump body adapted for mounting upon the chassis of a motor vehicle.

The primary object of the invention is to provide a dump body embracing means for effectively holding the same in a horizontal load retaining position and operable upon release of the same for tilting the body to its dumping inclined position.

Another object of the invention is to provide a dump body which may be readily manually tilted to dumping position with facility and ease.

A further object of the invention is to provide a dump body having simple and effective means for locking the tail gate thereof in closed position and automatically operable by engagement with a part of the motor vehicle chassis when the body is tilted to dumping position for releasing the end gate.

Other objects will appear as the nature of the invention is better understood, and the same consists in the novel form, combination, and arrangement of parts hereinafter more fully described, shown in the accompanying drawing and claimed.

In the drawing wherein like reference characters indicate corresponding parts throughout the several views:

Figure 1 is a fragmentary side elevational view illustrating the rear end portion of the motor vehicle chassis equipped with a dumping body constructed in accordance with the present invention, and with the body disposed in its normal substantially horizontal load retaining position, and Figure 2 is a view of the device shown in Figure 1, partly in side elevation and partly broken away and in section with the body in its tilted load dumping position.

Referring more in detail to the drawing, 5 indicates generally the rear end portion of a motor vehicle chassis that is equipped with ground engaging supporting wheels 6 and embodies the usual differential housing 7. In accordance with the present invention, a pair of side sills 8 are mounted longitudinally upon the frame of the chassis 5 so as to be rigid with the latter for remaining in a horizontal position and terminating at the rear end of the chassis as shown clearly in the views. The wagon body or box 9 is of conventional form, and in accordance with the present invention is mounted upon sills 10 that have hinged connection at points intermediate their ends and the ends of the body 9 with the rear ends of the sills 8 as indicated at 11, the hinged connections 11 being only slightly rearwardly of the transverse center of the body so that a comparatively small amount of power may be applied to the rear end of the body for swinging it from its horizontal to its tilted position. In other words, the weight of the body 9 and its contents is substantially equalized at opposite sides of the hinges 11, so that the body will normally assume a horizontal position but may be readily tilted with the expenditure of comparatively little manual power.

An end gate 11 is provided for closing the rear end of the body 9, and this end gate 11 is hinged to the body adjacent its upper edge as at 12 so that when the body is horizontal, the end gate will swing to a closed vertical position under the influence of gravity at the same time maintaining this vertical position when the body is tilted so as to swing open as shown in Figure 2 under the influence of gravity. Hinged for vertical swinging movement to the under side of the body 10 adjacent its rear end is a catch 13 having a hooked rear end adapted to engage the lower end of the end gate 12 for maintaining the latter in a closed position, and this catch 13 includes an extension 14 to be engaged by a spring 14' by means of which the catch is normally maintained in locking or latching position. The extension 14 further is constructed, arranged and formed so as to engage the rear axle housing 7 when the body 9 is tilted so that said catch will be swung for releasing its hooked rear end from the end gate whereby the latter will be automatically released when the body 9 is fully tilted.

A bracket 15 is secured to the forward end of the body 9 at one side thereof and journalled in this bracket is a crank shaft having an upwardly extending arm or lever 16 the upper end of which is connected to a hand lever 17, by means of a rearwardly extending link or rod 18. The lever 17 is pivoted for vertical swinging movement as at 19 to the adjacent side of the body 9, and is adapted when swung upwardly and rearwardly to exert a pull upon the link 18 for causing rearward swinging movement of the arm 17 and thereby releasing a hook 20 from a keeper 21, that is mounted upon the adjacent sill 8, the hook 20 being rigid with the crank shaft which carries the arm 16. Furthermore, the lever 17 is of such a length as to project rearwardly beyond the rear end of the body 9 when swung to release the hook 20 so as to form a lever upon which downward pressure may be exerted for causing the body 9 to be tilted, movment of the lever 17 downwardly beyond a predetermined point being prevented by engagement of said lever with a projecting member of the wagon box. Specifically, a depending lug or lateral projection 22 is provided upon the lever 17 adapted to engage the adjacent projecting ends of a cross bar 23 upon which the rear end of the body 9 is mounted and which, in turn, is mounted upon the rear ends of the sills 10. It is apparent that when the lever 17 is swung upwardly and forwardly, the hook 20 is caused to engage the keeper 21 for maintaining the body 9 in its horizontal load retaining position as shown in Figure 1, the lever 17 being at this time extended forwardly from its pivot and thereby acting to positively maintain the hook 20 engaged with the keeper 21. A suitable bracket 24 is secured upon the adjacent side of the dump body 9 for limiting the forward swinging movement of the lever 17 to a proper position wherein the hook 20 properly engages the keeper 21 for maintaining the body horizontally disposed.

In the normal load retaining position of the device, as shown in Figure 1, the catch 13 is engaged with the wagon box end gate 11 for maintaining the latter closed and the hook 20 is engaged with the keeper 21 for maintaining the body 9 horizontal, release of the hook 20 being prevented by the normal tendency of the lever 17 to swing downwardly, and thereby exert forward movement upon the link 18 necessary to engage the hook 20 with the keeper 21. When it is desired to dump the contents of the body 9, the lever 17 is swung upwardly and rearwardly so as to swing the hook 20 rearwardly through the medium of the link 18 and arm 15 and to bring the lug 22 into engagement with the cross piece 23. Further downward movement of the lever 17 will cause the body 9 to tilt about the transversely aligned hinges at 11, and due to the fact that the load is centered at opposite sides of or forwardly and rearwardly of the hinges 11 a comparatively small amount of manual power is necessary to effect such tilting of the body. As the body tilts, the forward end of the hook 13 is engaged with the transverse casing 7 and the hook 13 is thereby swung to disengage in the rear hooked end from the wagon box end gate 11 so that the latter may swing away from the rear end of the wagon box or body and thereby automatically permit dumping of the contents of the body 9. In this manner, only operation of the lever 17 is necessary for releasing the body whereby it may be tilted and for exerting a pull upon the body so that the same is caused to tilt, as well as effecting the unlocking or unlatching of the end gate 11 whereby the contents of the body may discharge when the latter is tilted.

In order to limit the tilting movement of the body to a proper position, the forward end of the body is connected with the sills 8 by means of a flexible connection or chain 25, one end of which carries a rod 26 that is slidable through a guide 27 carried by one of the sills 8. A cushion or compression spring 28 surrounds the free end of the rod 26 between an abutment 29 and the guide 27 so as to cushion the pull exerted upon the chain 25 when the body is tilted and to thereby prevent the catch 13 from striking the differential housing 7 a hard blow such as would cause damage to these parts.

From the foregoing description, it is believed that the construction and operation as well as the advantages of the present invention will be readily understood and appreciated by those skilled in the art.

What I claim as new is:

1. In a dumping body for vehicles, a body pivotally mounted adjacent to and slightly rearwardly of its transverse center for vertical swinging movement upon a horizontal axis, a lever pivoted to one side of the body for vertical swinging movement and adapted to extend beyond the rear side of the body when swung upwardly and rearwardly to form a lever upon which a downward pull may be exerted for tilting the body, and means including a hook movable to latching position upon upward and forward swinging movement of said hand lever for retaining the body in its horizontal load retaining position.

2. In a dump body for motor vehicles, a tiltable body adapted to be supported on the vehicle chassis, a keeper adapted to be connected to said chassis at the forward end of the body, a pivoted latch mounted on the body for cooperation with the keeper, a lever pivotally mounted upon said body at a point between one end and the pivotal mounting of the body, said lever being swingable from a forward position to a rearward position to extend beyond the corresponding end of the body, stops mounted on said body for cooperation with said lever to limit the swing in opposite directions, and a connection between the lever and said latch.

3. In a dump body for vehicles, a body adapted to be pivotally mounted upon a vehicle chassis, a bracket carried by the forward end of the body, a latch pivotally mounted on said bracket and including an upwardly extending arm, a keeper adapted to be mounted upon the chassis of the vehicle, said latch being adapted to cooperate with said keeper, a lever pivotally connected to one side of said body at a point between the pivotal mounting of the body and the rear end thereof, said lever being swingable to forward and rearward positions and provided intermediate its ends with a projection adapted to engage a part of the body when the lever is swung to a rearwardly extending position, and a link connected with the aforesaid arm and with said lever affording a connection therebetween so that when the lever is swung from a forward to a rearwardly extending position it will disengage the latch of said keeper.

In testimony whereof I affix my signature.

NEWTON WELTON.